United States Patent
Reynolds et al.

[11] 3,802,784
[45] Apr. 9, 1974

[54] MICRODENSITOMETER HAVING LINEAR RESPONSE

[75] Inventors: George O. Reynolds, Waban; John D. Boardman, Chelmsford, both of Mass.; Albert E. Smith, Riverside, Calif.

[73] Assignee: Technical Operations, Incorporated, Burlington, Mass.

[22] Filed: Feb. 16, 1972

[21] Appl. No.: 226,746

[52] U.S. Cl............... 356/201, 356/203, 356/205
[51] Int. Cl....................... G01n 21/06, G01n 21/22
[58] Field of Search .......... 356/201, 202, 203, 204, 356/205, 206

[56] References Cited
UNITED STATES PATENTS

| | | | |
|---|---|---|---|
| 3,518,014 | 6/1970 | Weber | 356/203 |
| 3,705,755 | 12/1972 | Baer | 356/203 |
| 3,012,466 | 12/1961 | Wiebe | 356/203 |
| 3,426,211 | 2/1969 | Anderson | 356/201 |
| 3,424,534 | 1/1969 | Miller et al. | 356/203 |

*Primary Examiner*—John K. Corbin
*Assistant Examiner*—V. P. McGraw
*Attorney, Agent, or Firm*—Alfred H. Rosen; Frank A. Steinhilper

[57] ABSTRACT

This disclosure describes a microdensitometer having an optical system which collects transmitted light without imaging the sample being analyzed. The sample under analysis is illuminated by an unresolved focused image of the scanning aperture (e.g.: slit or hole) and approximately all of the transmitted light is collected for analysis. This microdensitometer responds linearly to irradiance transmissivity without dependence on the spatial coherence of the illumination. A coherent light source is also illustrated.

12 Claims, 11 Drawing Figures

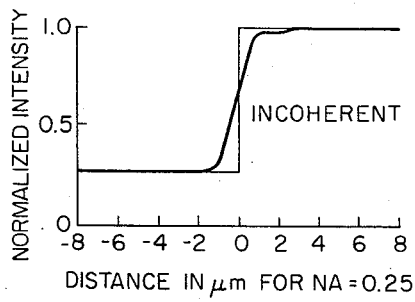
FIG. IA
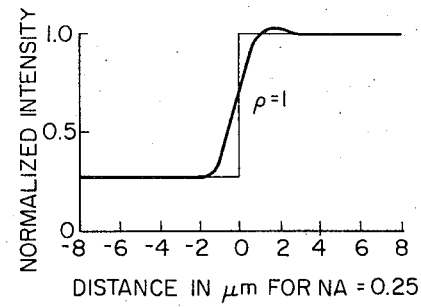
FIG. IB
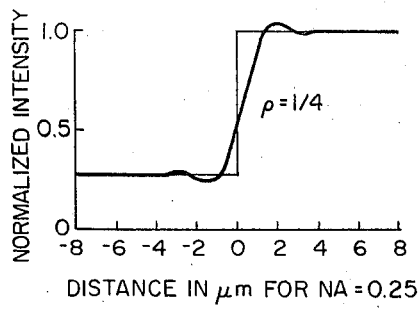
EDGE TRACES AS A FUNCTION OF THE COHERENCE INTERVAL
FIG. IC
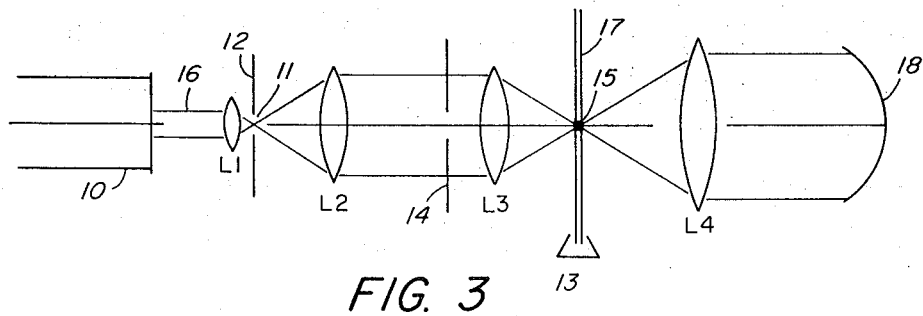
FIG. 3

TRANSMITTANCE EDGE IN COHERENT LIGHT FOR NA = 0.25

COHERENT SPREAD FUNCTION FOR NA=0.25, λ=0.63μm

π/2 PHASE EDGE IN COHERENT LIGHT FOR NA = 0.25

TYPICAL COHERENCE FUNCTION FOR NA = 0.25

COMPARISON OF THE VARIOUS DIMENSIONS INVOLVED IN TYPICAL EDGE SCANS

MICRODENSITOMETER HAVING LINEAR RESPONSE

BACKGROUND OF THE INVENTION

This invention relates to microdensitometers, and more particularly to improvements in microdensitometer optical systems and methods to provide an instrument response that is inherently linear for small scanning apertures about 25 μm or less, independent of object spatial frequency and mode of illumination. The term "μm" means micro-meter or micron.

A microdensitometer is an optical instrument which scans two-dimensional arrays of light transmissive or reflective entities, such as a photographic record, and provides quantitative information about the density-transmission, or reflectance of the scanned array or record, on a point-by-point basis. Thus, the microdensitometer is used to scan and plot, in one dimension at a time, or in a two-dimensional presentation, density-transmission characteristics or brightness characteristics of radiographs, photographic transparencies, biological specimens, paper specimens (to analyze basis-weight, for example) and a wide variety of X-ray, astronomical and other graphic and photographic records.

Applications of the microdensitometer have grown as the need for precise photometric information has increased. From an instrument used primarily by spectroscopists, the microdensitometer has become the primary tool for those who have an interest in extracting the last bit of information from a photographic record. Yet the optics of the basic microdensitometer design has remained unchanged since the first photoelectronic instrument. A light source is imaged on a pre-slit, which in turn is imaged on the record (film) to be measured. The film illuminated by the pre-slit is imaged on the plane of the exit slit. With the exit slit smaller than the area illuminated by the pre-slit, the record is scanned by the exit slit. A photodetector behind the exit slit and a feedback loop or monitoring loop to compensate for fluctuations in the light source complete the basic instrument. It is generally assumed that the pre-slit image in the film plane and in the plane of the exit slit is incoherent, so that motion of the film image relative to the exit slit produces a convolution of the exit slit with the incoherently illuminated photographic image, and the spatial frequency spectrum of the machine's output is the product of the spectrum of the object and an instrumental transfer function. This assumption has now been demonstrated to have practical limitations which have placed a limit on the utility of microdensitometers in fields of high resolution microdensitometry.

A photographic image may be considered to be an array of space-resolved photometer records of the apparent surface radiance of objects within the camera view. Similarly, a specimen of paper or a section of a biological specimen may be considered to be an array of space-resolved entities each having a unique optical density-transmission or reflectance characteristic.

Normally, then, a microdensitometer is used to measure optical density (or reflectance) as a function of position in an array, such as a photographic image. A microdensitometer basically perfords two operations: first, it images the object of interest; and then it scans the image. The optical design of conventional microdensitometers is similar to that of a microscope; that is, the sample is illuminated by a condensor system (influx optics) that focuses a slit on the sample which is then imaged (by the efflux optics) at some magnification. The image falls upon a slit that, as the sample is moved, effectively scans the image. It has been shown by Parrent & Becherer[1], [1 G. B. Parrent & R. J. Becherer, J. Opt. Soc. Am. 57, 1479 (1967)] Swing[2] [2 R. E. Swing, J. Opt. Soc. Am. 60, 1151A (1970)] and Kinzly[3] [3 R. E. Kinzly, J. Opt. Soc. Am. 60, 1151A (1970)] that such microdensitometers operate in a nonlinear mode at high spatial frequencies. This is unavoidable, owing to the optical design of these instruments.

Limitations arise as a result of the mutual coherence of the illumination with the result that the exit slit is scanning a partially coherent image. The partially coherent image fails as a linear reproduction of the object transmittance, deviations from linearity becoming evident at high spatial frequencies, in the vicinity of edges and when the object has a complex transmittance (i.e.: when there exists a phase term in the transmittance).

It thus turns out in practice that, as the attempt is made to use smaller and smaller scanning apertures (e.g.: 25 μm or less) in order to acquire the information that may be in a record containing high spatial frequencies (i.e.: smaller and smaller space-resolved record elements) or to perform measurements at sharp edges or on phase objects, the point is reached where illumination in a microdensitometer becomes partially coherent, and the imaging system therefore becomes nonlinear in intensity, and edge-ringing, for example, may become apparent. Through this mechanism, the instrument itself distorts the results. Moreover, the distortion introduced by an instrument is generally unique to the design of that instrument, being the result of scanning aperture size and of the cut-off frequency of the efflux optics, each of which comprises several components contributing to its unique character.

If the instrument has a linear response, the output is related to the input through a transfer function, and a knowledge of the transfer function enables the user to accomodate to the instrument effects in the output readings. In an optical system, it is always the irradiance of light that is measured. To apply a transfer function approach, the optical system must be linear in irradiance or intensity. It is obviously desirable to extend linearity of the optical system of a microdensitometer into the high-spatial-frequency ranges.

GENERAL NATURE OF THE INVENTION

According to the present invention, an optical system is provided that collects the transmitted light without imaging, and a microdensitometer is provided which eliminates the imaging portion of prior systems. The sample under analysis is illuminated by the focused image of the scanning aperture (e.g.: slit or spot) and approximately all of the transmitted light is collected for analysis. With this system, the microdensitometer responds linearly to irradiance transmissivity without dependence on the spatial coherence of the illumination. Since linear operation does not depend on the illumination, a coherent light source may be used if the added power of a laser is desirable, for example, to improve the system signal-to-noise characteristics. This linear instrument allows greater design flexibility because no image of the sample or exit slit is involved. The transfer function is bandlimited by the apertures of the light-transmitting optics. Microscope objectives have proved satisfactory.

An experimental linear instrument has been assembled for testing on an optical bench. The "scanning apertures" used were in the form of the Airy disc of a circular aperture and the $\sin^2 x/x^2$ of a slit or of a cylinder lens. Spots and lines of light less than $2\mu m$ have been achieved and measured experimentally.

It is therefore a principal object of this invention to provide an inherently linear microdensitometer instrument, limited in spatial frequency only by the size of the scanning aperture.

Another important object of the invention is to provide a microdensitometer which responds linearly to object transmittance up to the spatial frequencies that can be resolved by available optics, independent of source coherence and object phase.

Another object is to provide such an instrument in which the system transfer function is the Fourier transform of the scanning aperture irradiance.

A further object is to provide such an instrument in which the scanning aperture, i.e.: scanning spot or line of light, is determined by the limiting aperture of light transmitting optics.

A still further object is to provide such an instrument which demonstrates linearity with both edge width measurements and flat response to a phase edge.

Another object is to provide a microdensitometer which can use a laser as a source of illumination.

DESCRIPTION OF EMBODIMENTS OF THE INVENTION

These and other objects and features of the invention will become apparent from the following description of exemplary embodiments. This description refers to the accompanying drawings, in which:

FIGS. 1A-C is a set of graphs showing ambiguities introduced into an image of an edge arising from partial coherence of the image light;

FIGS. 2A-D is a set of graphs comparing the various dimensions involved in typical edge scans;

FIG. 3 is a schematic illustration of a linear microdensitometer according to the invention;

Figure 2A:
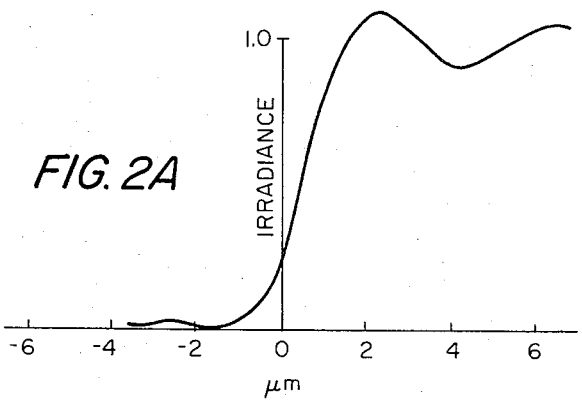
Figure 2C:
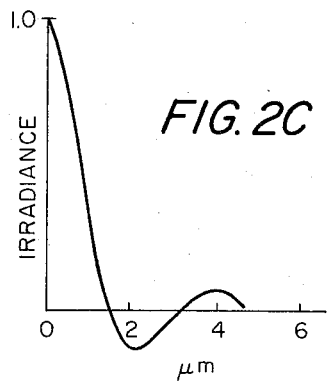
Figure 2B:
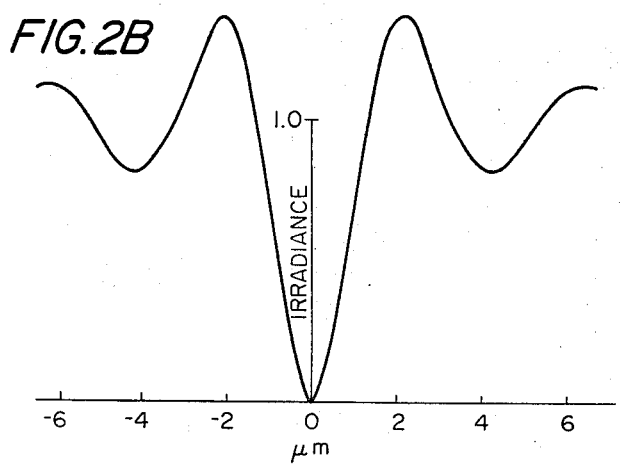
Figure 2D:
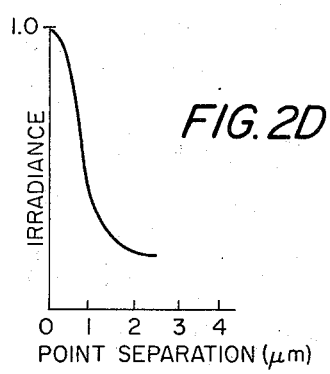

The effect of nonlinearities arising from partial coherence of the illuminating light on observed images is not immediately apparent. Of particular interest are the effects of the image of an edge. FIG. 1 shows the image of an edge under various coherence conditions as characterized by various values of $\rho$, the ratio of the width of the image lens spread function to the width of the mutual intensity function of the illuminating light as measured in the sample plane. It is apparent that with increasing coherence (FIG. 1B) the exact location of the edge becomes doubtful and that the more coherent system (FIG. 1C) exhibits edge-ringing. The edge-ringing of a partially coherent system is, in fact, difficult to observe and easily confused with an out-of-focus effect. The reason for the difficulty becomes clear when we realize that the coherence interval for a typical system as shown in FIG. 2 is about the same as the period for the ringing.

The practical consequences of coherence in the object illumination (nonlinearity in system response) are not always readily apparent since they occur as inconsistencies between different instruments. For the same instrument with different illuminating configurations, they appear only at high spatial frequencies, close to edges, and for phase objects. Probably the most readily available exhibit of a system nonlinearity is the scan of a phase edge. A phase edge or object does not appear at all in an incoherent system, but becomes one of the simplest devices for exhibiting the presence of partial coherence in an imaging system.

What happens to an edge image under partial coherence can be intuitively understood by an examination of FIG. 2. FIGS. 2a and 2b show the image of a transmittance edge and a phase edge respectively as they appear in coherent illumination through a bandlimited system. The spread function of the band-limited coherent system appears in FIG. 2c. In effect, the coherent image is the convolution of the spread function with the edge in question. A typical observed coherence function for a real optical system is illustrated in FIG. 2d. Within distances of about $1\ \mu m$ of the edge for this system, the coherent limit of coherence theory applies reasonably well. For distances greater than about $10-20\ \mu m$, the incoherent limit would apply, the phase edge would disappear, and the transmittance edge would effectively move and cease to "ring."

The optical system illustrated in FIG. 3 is intrinsically linear. A $cw$ laser source 10 produces a beam of light 16 which illuminates a pinhole aperture 11 in a mask 12 through a lens L1 that focuses the beam of light 16 on the pinhole. This subsystem is the effective optical source for the instrument. The principal reason for using the laser source is to produce a high concentration of light on the pinhole. Since the coherence or noncoherence of the pre-slit is shown to be immaterial, there is no fundamental reason why the instrument will not function linearly with a thermal light source. The light passes to a collimating lens L2, and then to a condenser L3, which refocuses the light into a scanning spot 15. The size of the pinhole 11 may be varied within the condition that for an optimum (smallest) scanning spot 15 the pinhole should not be resolved by the condenser L3. A 5 $\mu m$ diameter spot, and a spot $< 2\mu m$ in diameter have been used in an experimental system in which the beam was collimated and refocused by microscope objectives, and the dimensions of the scanning spot 15 were determined principally by the numerical aperture of the refocusing lens L3. An iris 14 may be used between the collimating and condensing lenses L2, L3.

The system has no exit slit. The sample (e.g.: film) under analysis is located in a plane 17 where it may be held by supporting means 13 of any well-known kind, and light passing through it at the spot 15 is collected with a light-collecting system represented by an output lens L4, which preferably has a high numerical aperture to gather as nearly as possible all the light passing through the sample.

The light-collecting system ensures that substantially all the transmitted light falls on the photodetector 18 without imaging the film sample. Since the sample is not imaged, questions regarding partial coherence do not arise. The image formed by a spherical condenser lens L3 with a circular aperture 11 is, within the limits of aberration correction and focal setting, an Airy disc.

If the point source is unresolved by the condensing lens and the condenser acts without aberration, the system transfer function is the autocorrelation of the exit pupil function. For a spherical lens, this is the transform of $[2J_1(kr)/kr]^2$, and for a cylindrical lens it is the transform of $\sin^2 x/x^2$. Since all the radiation passing through the film emulsion is collected without imaging by the optics following the film plane, the system is photometrically linear with transmittance.

Another bonus of the linear microdensitometer as just described is that the coherent speckle that appears as noise in the scanning of an optical image is completely smoothed out by the collector. The system of the invention measures singly diffuse density, rather than specular density as in prior systems.

Figure 4:
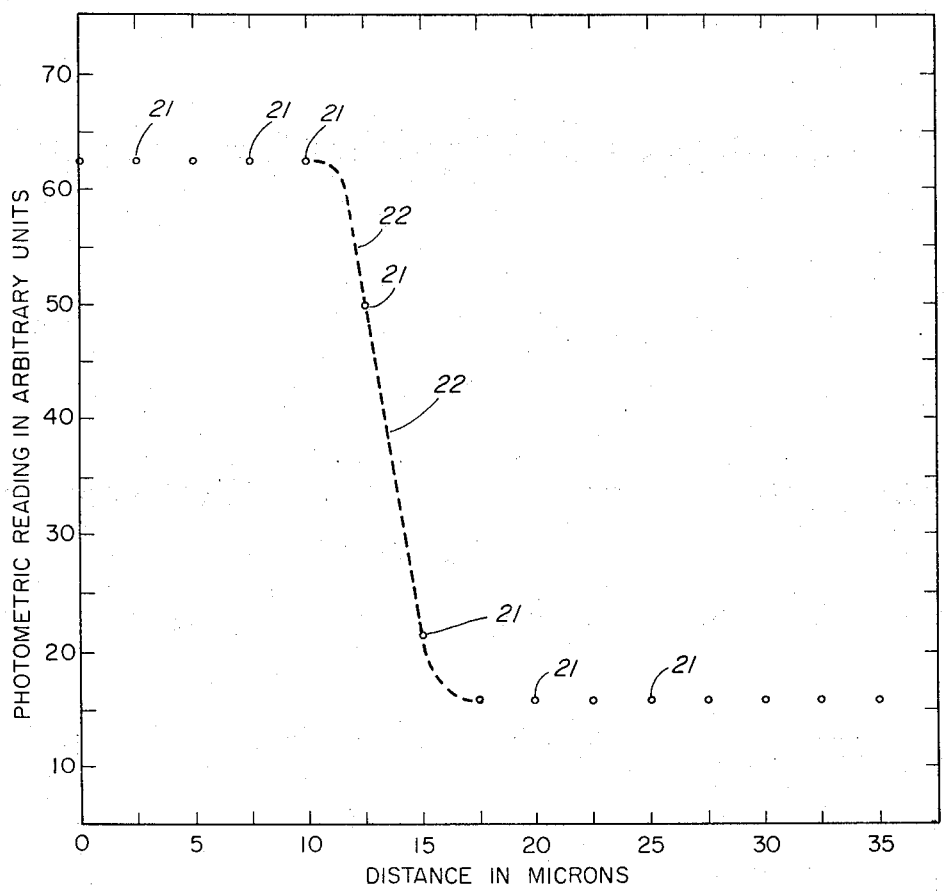
FIG. 4 is a graph showing measurement of an edge with a linear microdensitometer according to FIG. 3.

A system according to FIG. 3 was bench tested, using a photomultiplier preceded by a diffuser as the photodetector 18, and microscope objectives for lenses L1, L2, L3, and L4. A film sample having an evaporated edge on it was located in plane 17 and scanned with a 5 $\mu$m spot 15 by moving the film in 2½ $\mu$m increments and taking readings on the photomultiplier. The results are plotted in FIG. 4, where the actual data points 21 obtained are marked. The dotted line 22 shows the theoretical trace obtained by convolving a 5 $\mu$m spot with a perfect edge. The tests were perfomed a number of times, and the results were repeatable. A trace of the same evaporated edge with a prior-art microdensitometer, using a 5 $\mu$m scanning aperture, yielded results quite similar to the curve shown in FIG. 1C, that is, edge-ringing was present.

Thus, it is shown that the method of coherent spot scanning according to the invention gives improved results at scanning apertures at least as small as about 5 $\mu$m, in that edge-ringing and speckling are essentially eliminated.

Similar results have been achieved with scanning spots of light less than 2 $\mu$m in diameter.

Figure 5:
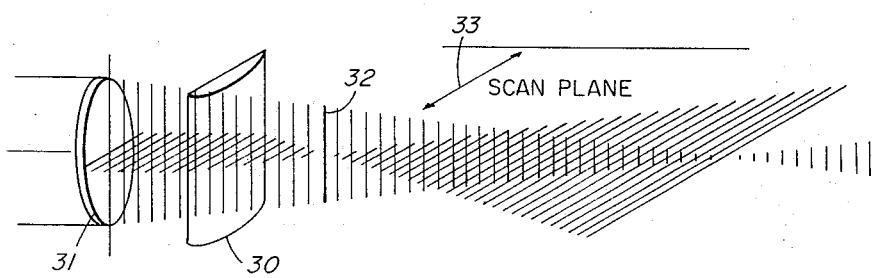
FIG. 5 is a schematic illustration of a cylinder lens system used to form a slit or line image.

The invention has been practiced using slit apertures as well as pinhole apertures, of various widths. A slit image may be formed either by imaging an illuminated slit or by using cylindrical optics to form the line image of an illuminated pinhole. Slit scans were made with a simple plano-convex cylinder lens 30 (coated for reflection) used in conjunction with a spherical lens 31 (in the form of a microscope objective) as shown in FIG. 5. The quality of the results has been excellent considering the simplicity of the optics. The line image 32 was formed in the film plane, and the scan plane 33 is perpendicular to it. Light passing through the sample (to the right in FIG. 5) from the line image 32 was then gathered by a light-collector system, as in FIG. 3, for example.

Figure 6:
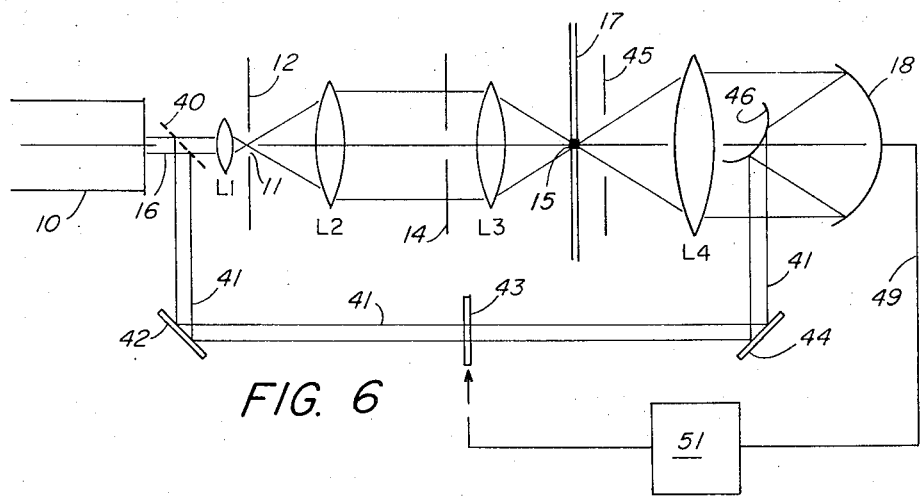
FIG. 6 is a schematic illustration of another linear microdensitometer according to the invention, employing a reference beam.

FIG. 6 illustrates an optical system like that in FIG. 3 having a reference beam system including a density wedge for measuring transmittance of the sample under examination. Parts in common with FIG. 3 have the same reference characters. A shutter 45 has been added. The reference beam 41 is taken from the laser output beam 16 with a beam-splitter 40 and relayed by a first plane mirror 42 to the density wedge 43. Light passing through the density wedge is relayed by a second plane mirror 44 to a convex mirror 46 and thence to the photodetector 18. A difference signal, derived from this light and the light coming from the collector lens L4 is supplied over line 49 to a servo-system 51, which moves the wedge 43 to reduce the difference signal to zero, that is, to a null. The servo-system, in a well-known way, then supplies the measure of transmittance desired.

The invention can be practiced with scanning spots of sizes smaller than 2 $\mu$m, and scanning lines of equally small dimensions. The system of the invention, aptly called a "linear microdensitometer," responds linearly to irradiance transmissivity without dependence on the spatial coherence of the illumination. In this connection, it is noted that the term "irradiance" implies that one is measuring a radiometric quantity rather than a photometric quantity.

It is contemplated that many variations in the invention will occur to those skilled in the art. For example, the light-collecting system can take other forms, as can the optical system for forming the scanning spot or line, as well as the light source itself. The invention is applicable to any system or process which employs, in combination the step of forming the light from the source into a beam having a desired cross-sectional configuration, spot or line (slit), for example, to define the sample size or the scanning aperture, and the step of collecting all the light that is incident on the sample through the scanning aperture.

We claim:

1. Method of microdensitometry comprising the steps of providing a source of light, forming with said light a beam having a cross-sectional configuration sufficiently small that the light therein exhibits at least partial spatial coherence, for illuminating a prescribed sample of a specimen to be examined, locating a specimen to coincide with said configuration so as to illuminate said sample of said specimen with said configuration, and collecting from said sample in a mode that does not image the specimen substantially all the light of said beam emmanating from said sample.

2. Method according to claim 1 comprising the additional step of locating a specimen in said beam at said configuration, scanning said specimen with said configuration, and collecting substantially all the light from successively illuminated samples of said specimen.

3. Method according to claim 1 in which said beam is found from coherent light.

4. Method according to claim 1 in which said configuration is a spot limited in size by the diffraction pattern of the light transmitting optics.

5. Method according to claim 1 in which said configuration is a line limited in width by the diffraction pattern of the light transmitting optics.

6. A microdensitometer comprising a source of light optical means for forming with said light a beam having a cross-sectional configuration sufficiently small that the light therein exhibits at least partial spatial coherence, means for supporting a specimen for illumination by said configuration, means for collecting from said specimen in a mode that does not image the specimen substantially all the light of said beam that is incident upon said specimen, and means for analyzing said collected light.

7. A microdensitometer according to claim 6 including means to effect a scanning of said beam over said specimen.

8. A microdensitometer according to claim 6 in which said light is substantially coherent at said source.

9. A microdensitometer according to claim 8 in which said source is a laser.

10. A microdensitometer according to claim 6 in which said source includes a pinhole and said optical means forms an unresolved image of said pinhole into a spot having a diameter which is limited in size by the diffraction pattern of said optical means, to provide said configuration for illuminating said specimen.

11. A microdensitometer according to claim 6 in which said optical means comprises spherical lens means and cylindrical lens means for forming an unresolved line image of said source, for illuminating said specimen with a configuration similar to that provided by a slit aperture having width which is limited in size by the diffraction pattern of said optical means.

12. A microdensitometer according to claim 6 including means to form a reference beam from said source and means to compare said reference beam with said collected light, for measuring transmittance of said specimen.

* * * * *